(12) United States Patent
Thore

(10) Patent No.: US 11,187,078 B2
(45) Date of Patent: Nov. 30, 2021

(54) METHOD FOR EVALUATING CONNECTIVITY BETWEEN A FIRST WELL AND A SECOND WELL IN A HYDROCARBON PRODUCTION FIELD AND RELATED SYSTEM

(71) Applicant: TOTAL SA

(72) Inventor: Pierre Thore, Pau (FR)

(73) Assignee: TOTAL SA, Courbevoie (FR)

( * ) Notice: Subject to any disclaimer, the term of this patent is extended or adjusted under 35 U.S.C. 154(b) by 177 days.

(21) Appl. No.: 16/477,981

(22) PCT Filed: Jan. 20, 2017

(86) PCT No.: PCT/IB2017/000133
§ 371 (c)(1),
(2) Date: Jul. 15, 2019

(87) PCT Pub. No.: WO2018/134633
PCT Pub. Date: Jul. 26, 2018

(65) Prior Publication Data
US 2019/0360331 A1    Nov. 28, 2019

(51) Int. Cl.
*E21B 49/00* (2006.01)
*G01N 15/08* (2006.01)

(52) U.S. Cl.
CPC ....... *E21B 49/008* (2013.01); *G01N 15/0826* (2013.01)

(58) Field of Classification Search
CPC .............................. E21B 49/008; G01N 15/0826
See application file for complete search history.

(56) References Cited

U.S. PATENT DOCUMENTS

| 9,169,726 B2 | 10/2015 | Snedden et al. |
| 2015/0051838 A1 | 2/2015 | Champenoy et al. |

FOREIGN PATENT DOCUMENTS

| CN | 105404726 A | 3/2016 |
| EP | 2 990 595 A2 | 3/2016 |

(Continued)

OTHER PUBLICATIONS

Hou et al., Inferring Reservoir Interwell Dynamic Connectivity Based on Signal Processing Method, Feb. 7-9, 2012, International Petroleum Technology Conference, Bangkok, Thailand, 14 pp. (Year: 2012).*

(Continued)

*Primary Examiner* — Toan M Le
(74) *Attorney, Agent, or Firm* — Troutman Pepper Hamilton Sanders LLP

(57) ABSTRACT

A method includes obtaining a first time series of a first well parameter from the first well and a second time series of a second well parameter from the second well, processing the first time series to obtain a processed first time series, filtering the second time series by removing dynamic variations from the second time series to obtain a filtered second time series representative of static variations of the second time series, and determining a correlation between the processed first time series and the filtered second time series at various time shifts between the processed first time series and the filtered second time series, and determining a maximal correlation coefficient and a time shift at maximal correlation between the processed first time series and the filtered second time series, the maximal correlation coefficient being representative of the connectivity between the first well and the second well.

17 Claims, 7 Drawing Sheets

(56) References Cited

FOREIGN PATENT DOCUMENTS

Figure 1:
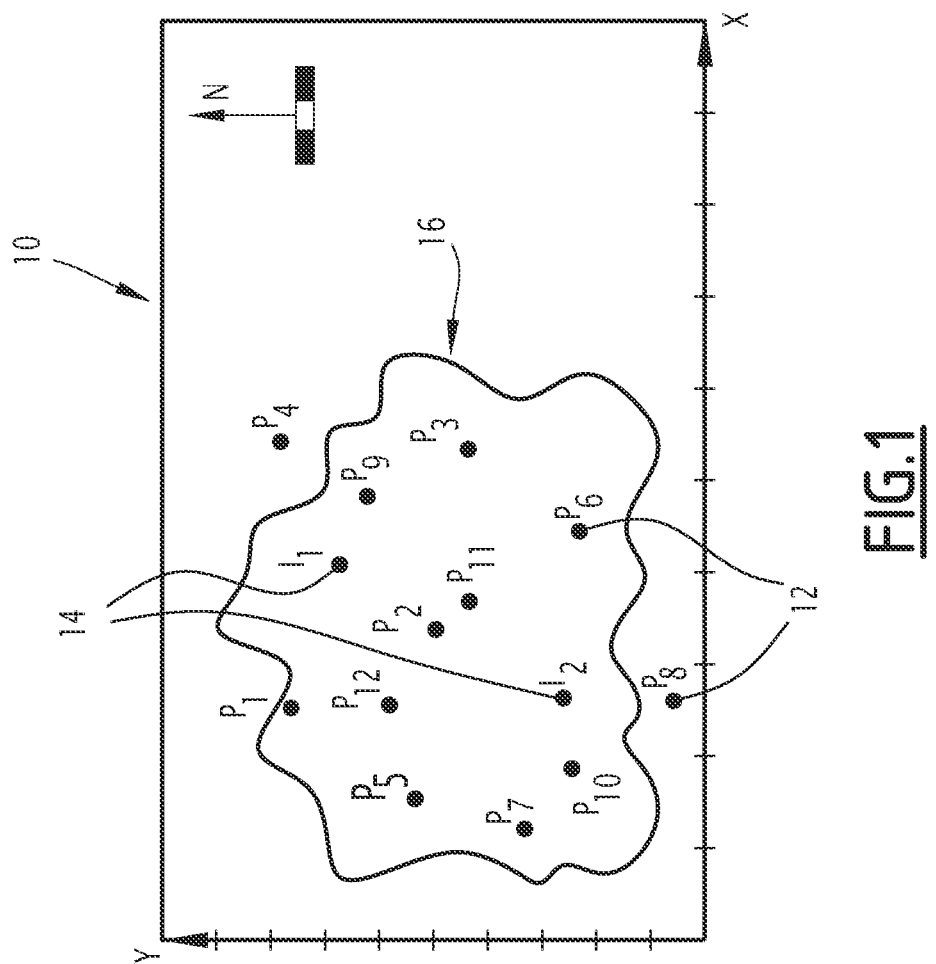

| | | | |
|---|---|---|---|
| EP | 2 990 595 | A3 | 6/2016 |
| WO | 2013066358 | A2 | 5/2013 |
| WO | 2013066358 | A3 | 5/2013 |

OTHER PUBLICATIONS

One Petro Search Results, Feb. 17, 2021, 11 pp. (Year: 2021).*
One Petro Search Results, Jul. 20, 2021, 11 pp. (Year: 2021).*
International Search Report issued in International Application No. PCT/IB2017/000133 dated Oct. 12, 2017.

\* cited by examiner

METHOD FOR EVALUATING CONNECTIVITY BETWEEN A FIRST WELL AND A SECOND WELL IN A HYDROCARBON PRODUCTION FIELD AND RELATED SYSTEM

CROSS REFERENCE TO RELATED APPLICATION

This is a U.S. National Phase Application under 35 U.S.C. § 371 of International Patent Application No. PCT/IB2017/000133, filed Jan. 20, 2017. The entire contents of which are hereby incorporated by reference.

BACKGROUND OF THE INVENTION

Field of the Invention

The present invention concerns a method for evaluating connectivity between a first well and a second well in a hydrocarbon production field.

Description of Related Art

Connectivity is one of the fundamental properties of a hydrocarbon reservoir that affects oil recovery activities. It corresponds to a measure of the degree of hydraulic communication between two locations (e.g. two wells) in the subsurface, through geological formations and pathways.

In the oil and gas industry, the connectivity between wells is essentially measured using drill stem test (DST) or other methods of well testing. The main feature of well testing methods consists in creating flow and/or pressure variations at a bottom of a well, for example by injection of fluids in the well into a geological formation, or by production of fluids from the geological formation. During the process, pressure, flow rate and their corresponding time variations are measured in a first well and in secondary wells located in the vicinity of the first well. The measurements are then interpreted in terms of hydraulic parameters, such as apparent permeability.

The main drawback of these methods is their cost. Indeed, such methods have to be carried out in a quiet environment, i.e. without production activities in the vicinity. Hence, these methods require stopping production activities, which is very expensive for the field manager.

Other methods for assessing connectivity consist in using markers spread from a first well and recovered in secondary wells potentially connected to the first well. Such methods also require quiet environment. They are also expensive and require special equipment.

BRIEF SUMMARY OF THE INVENTION

One aim of the invention is to provide a simple, inexpensive and efficient method for evaluating the connectivity between at least two wells in a hydrocarbon production field.

To this aim, the subject-matter of the invention is a method for evaluating connectivity between a first well and a second well in a hydrocarbon production field comprising:

(a) obtaining a first time series of a first well parameter from the first well and a second time series of a second well parameter from the second well, (b) processing the first time series to obtain a processed first time series, (c) filtering the second time series by removing dynamic variations from the second time series to obtain a filtered second time series representative of static variations of the second time series, (d) determining a correlation between said processed first time series and said filtered second time series at various time shifts between said processed first time series and said filtered second time series, and determining a maximal correlation coefficient and a time shift at maximal correlation between said processed first time series and said filtered second time series, the maximal correlation coefficient being representative of the connectivity between the first well and the second well.

The method according to the invention may comprise one or more of the following features, taken into consideration in isolation, or according to any one of any technically feasible combination:

- the first well parameter and the second well parameter are each chosen among bottom hole pressure, injection rate, fluid salinity or fluid temperature,
- the first well is an injection well or a production well and the second well is a production well,
- the filtering step comprises a sub-step of filtering the second time series to remove the dynamic variations from the second time series to obtain a corrected second time series, representative of the static variations of the second time series, the filtering being made with a non-linear filter, advantageously a median filter,
- the processing step and/or the filtering step comprise a sub-step of filtering a field depletion, advantageously with a mean filter,
- the method further comprises a step of determining a confidence index of the connectivity between the first well and the second well,
- the method further comprises a step of mapping the maximal correlation coefficient and/or the time shift at maximal correlation in the hydrocarbon production field,
- the first well is an injection well and the first well parameter is an injection rate, the processing step comprising a sub-step of calculating a pressure time series at a given distance from the first well, from an injection rate time series of the first well,
- the first well is a production well and the processing step comprises a step of filtering the first well time series by removing dynamic variations from the first time series to obtain a corrected first time series representative of static variations of the first time series,
- the first well and the second well are production wells and the method further comprises calculating a first location curve of an injection well connected to the first well and to the second well, based on a time shift at maximal correlation between the first time series of the first well and the second time series of the second well,
- the method further comprises calculating a second location curve of the injection well connected to the first well and to the second well, based on a time shift at maximal correlation between the first time series of the first well and an additional second time series of an additional second well connected to said injection well, the intersection of the first location curve and of the second location curve indicating the location of said injection well connected to the first well, to the second well and to the additional second well,
- the first well and the second well are production wells and the method further comprises determining an average diffusivity based on the time shift at maximal correlation between the first time series of the first well and the second time series of the second well and based on the location of an injection well connected to the first well and to the second well.

The invention also concerns a system comprising
a data recovery module for obtaining a first time series of a first well parameter from the first well and a second time series of a second parameter from the second well,
a processing module for processing the first time series to obtain a processed first time series,
a filtering module for filtering the second time series by removing dynamic variations from the second time series to obtain a filtered second time series representative of static variations of the second time series,
a correlation module for determining a correlation between said processed first time series and said filtered second time series at various time shifts between said processed first time series and said filtered second time series, and for determining a maximal correlation coefficient and a time shift at maximal correlation between said processed first time series and said filtered second time series, the maximal correlation coefficient being representative of the connectivity between the first well and the second well.

BRIEF DESCRIPTION OF THE SEVERAL VIEWS OF THE DRAWING(S)

Figure 2:
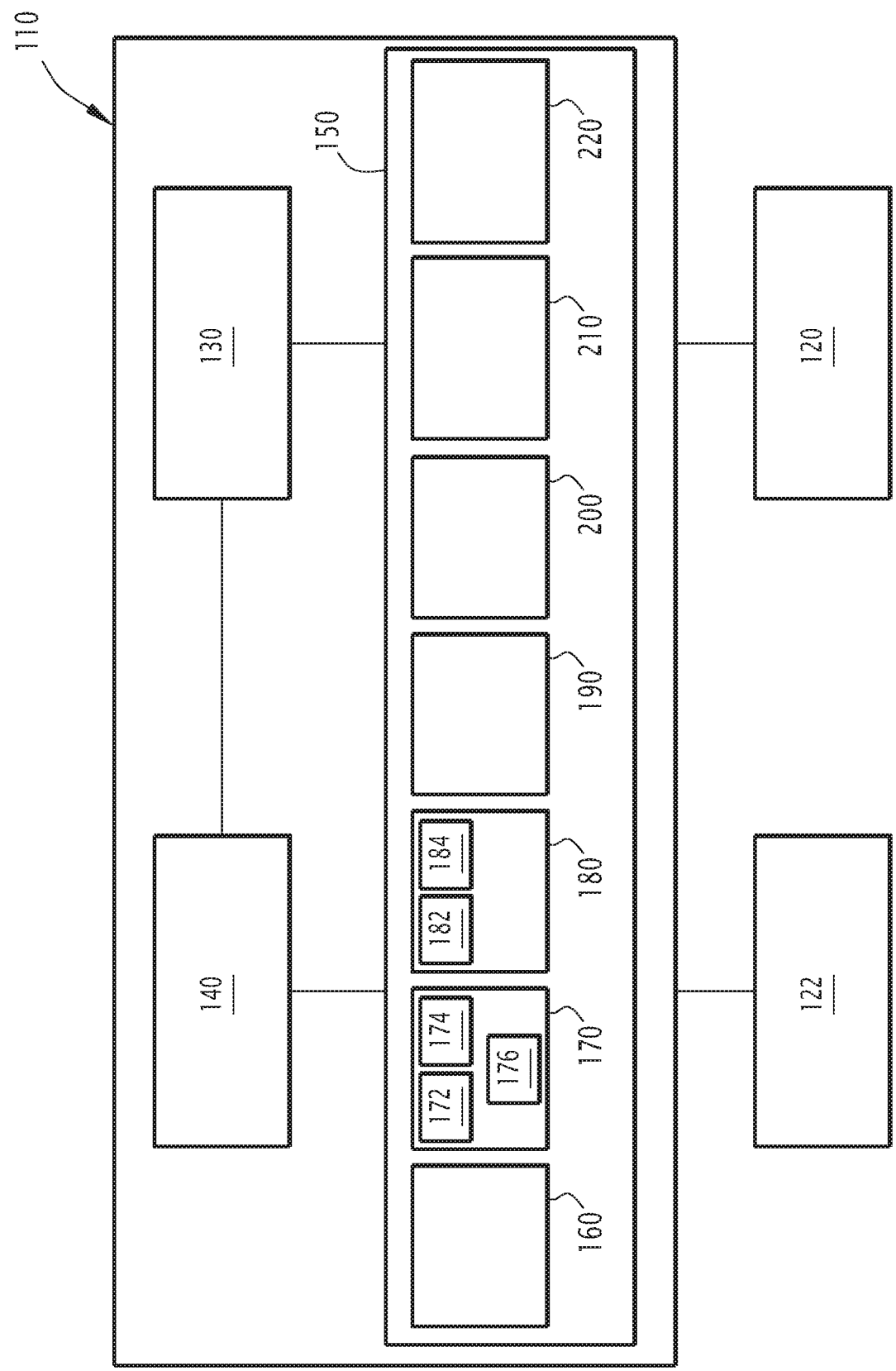
Figure 3:
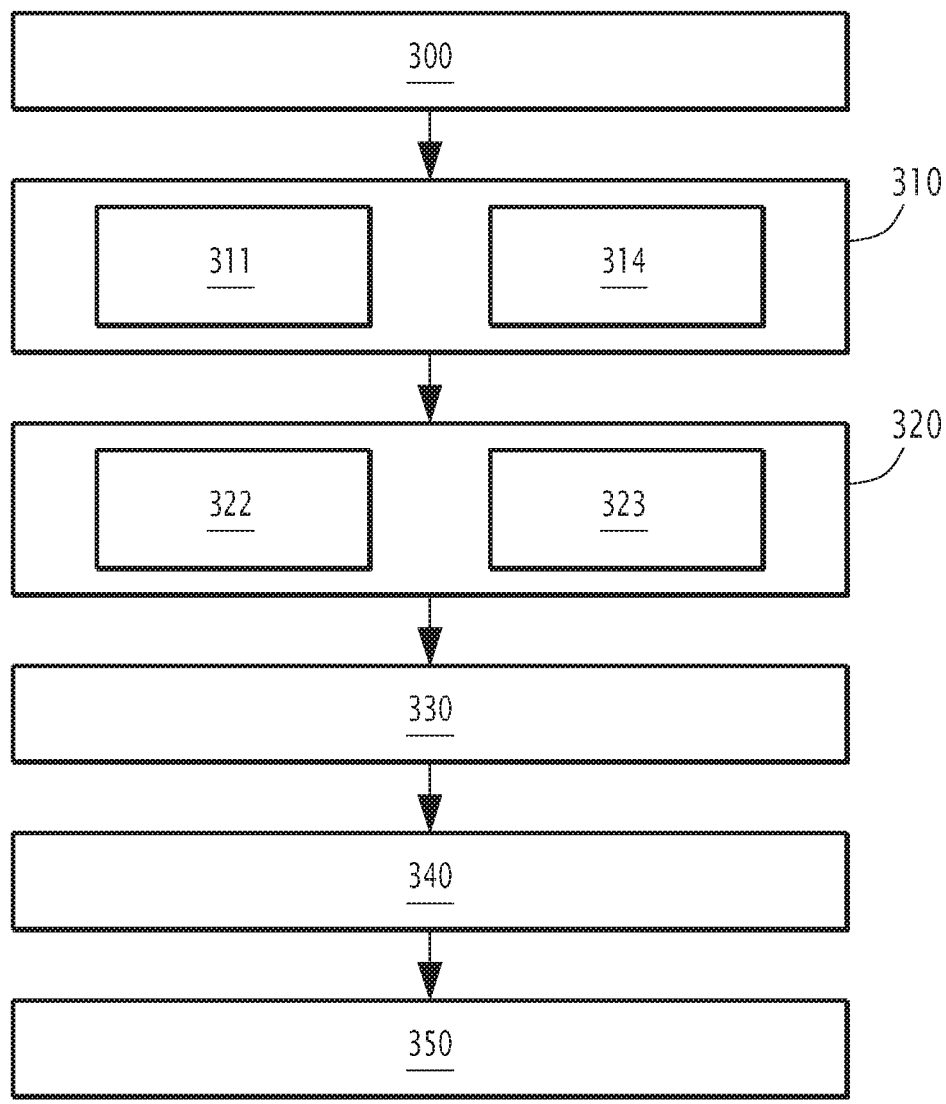
Figure 4:
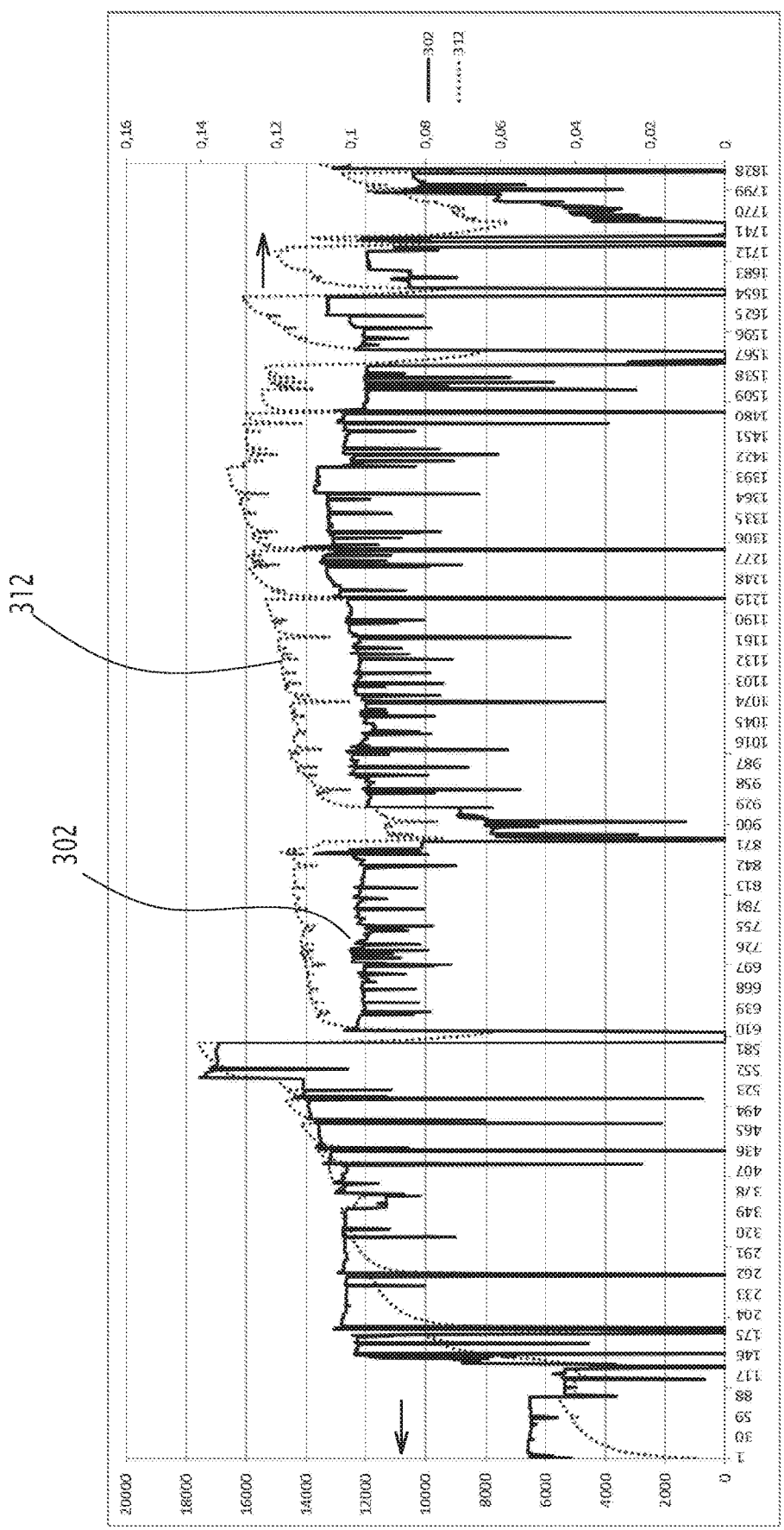
Figure 5:
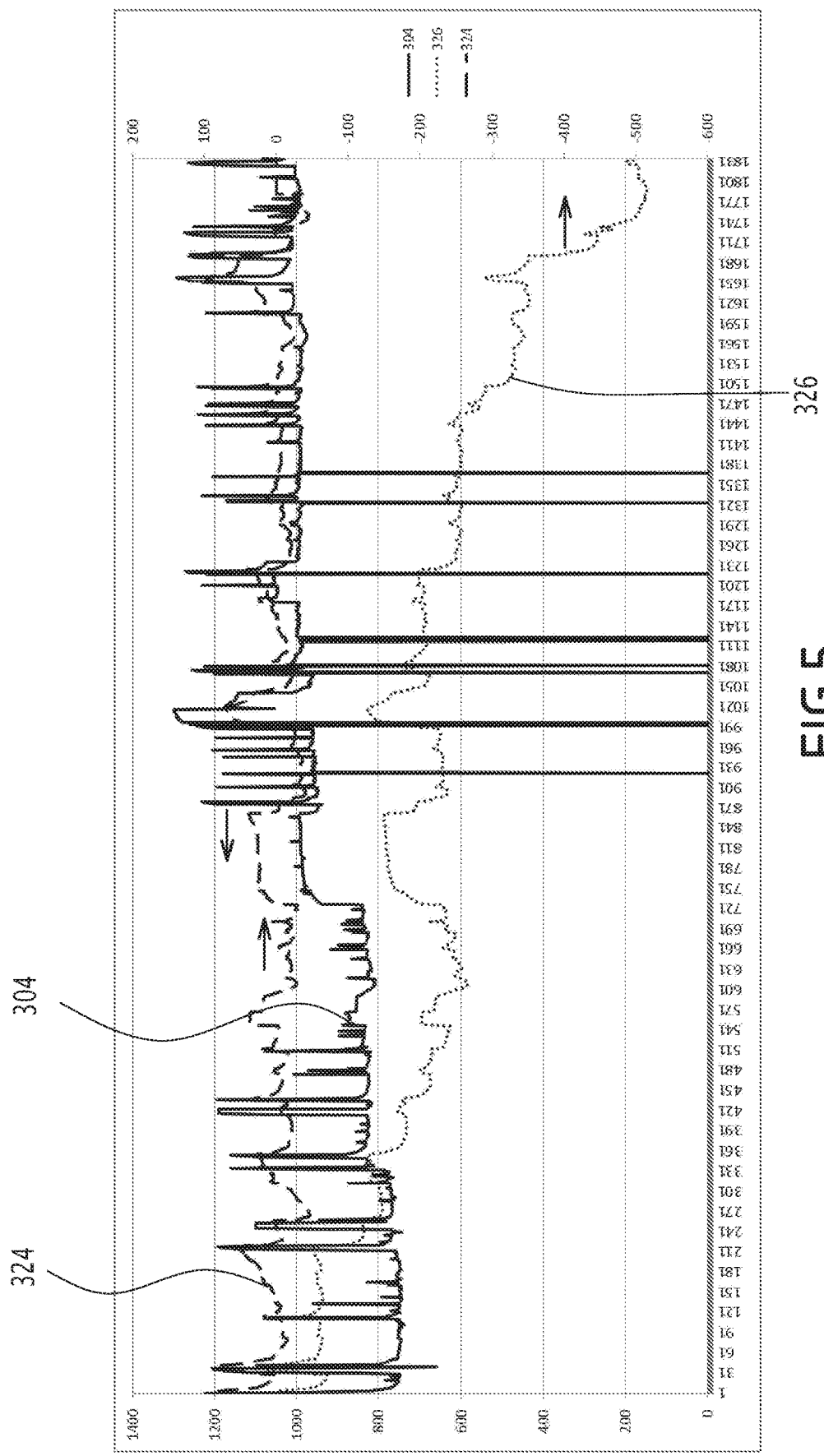
Figure 6:
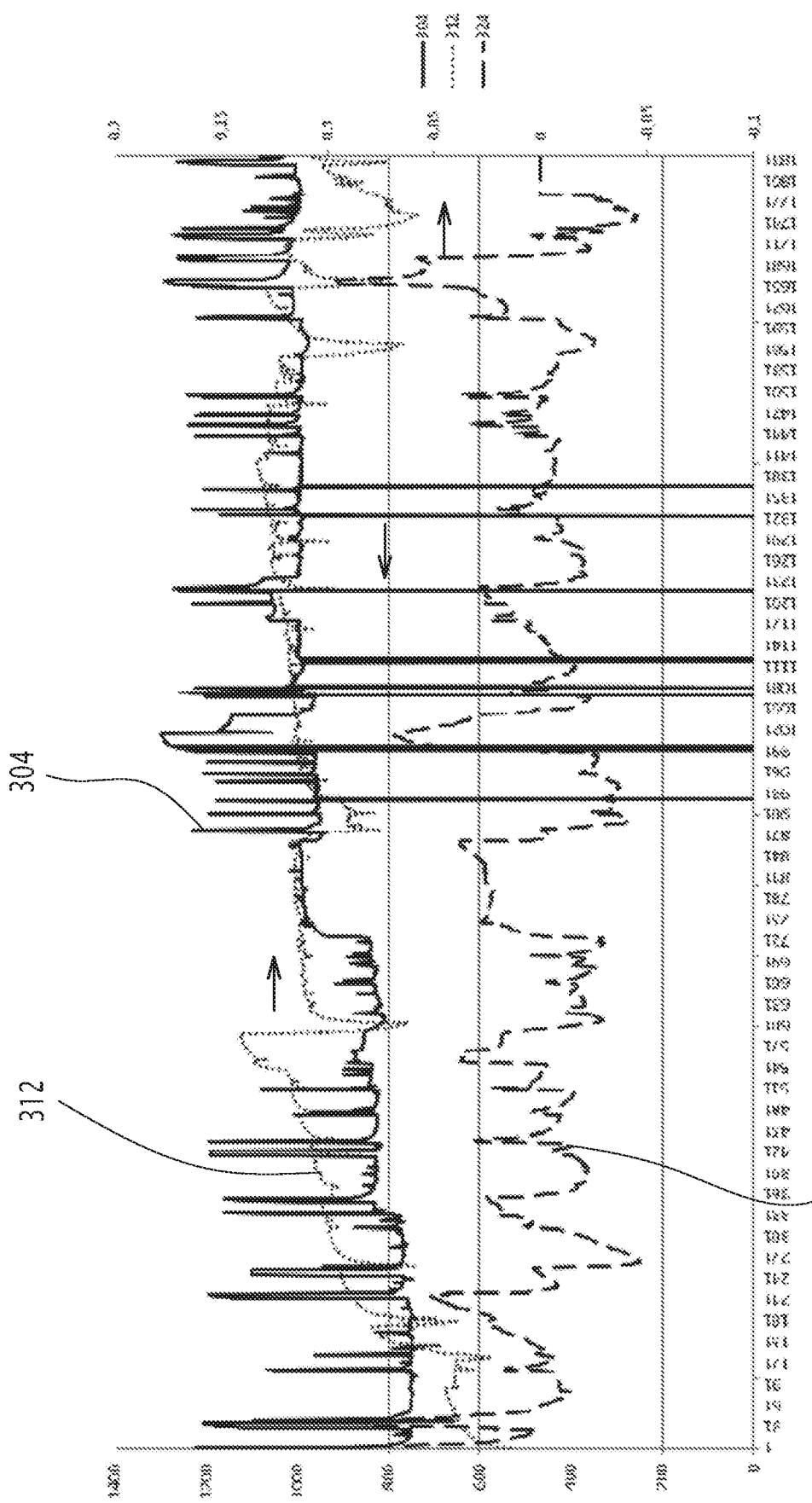
Figure 7:
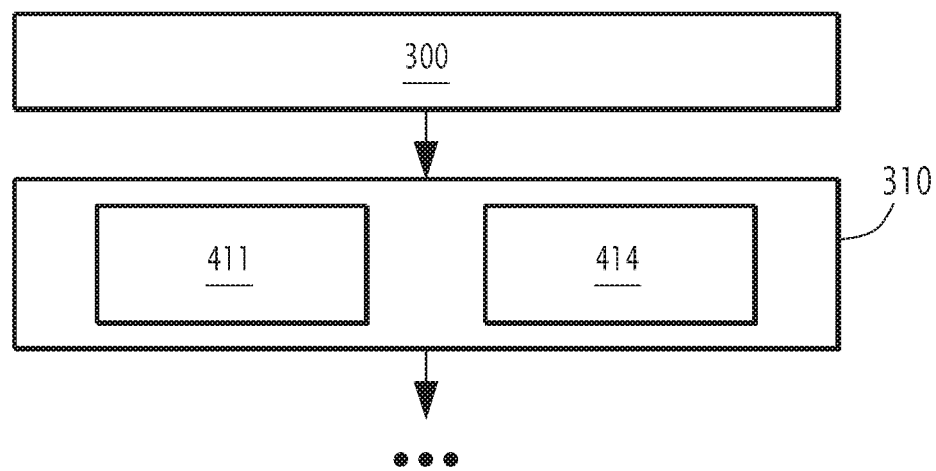
Figure 8:
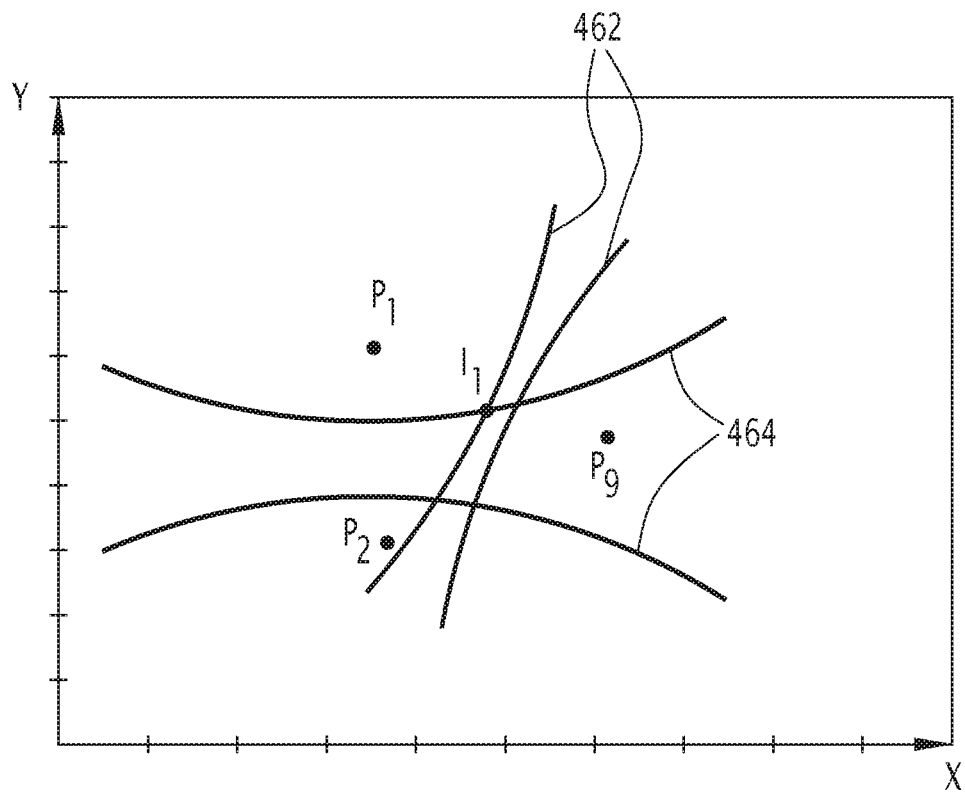

The invention will be better understood, upon reading of the following description, taken solely as an example, and made in reference to the following drawings, in which:

FIG. 1 is a schematic view of a geographical map of a hydrocarbon production field comprising injection wells and production wells, FIG. 2 is a schematic representation of a system for evaluating the connectivity between wells, according to the invention, FIG. 3 is a flow chart of a first method for evaluating the connectivity between an injection well and production wells, according to the invention, FIG. 4 is a graphical view of an injection rate time series at an injection well and a corresponding processed injection rate time series computed at a given distance from the injection well, FIG. 5 is a graphical view of a bottom-hole pressure time series measured at a production well and a corresponding filtered bottom-hole pressure time series, FIG. 6 is a graphical view of the injection rate and the processed injection rate time series of FIG. 4 and the filtered bottom-hole pressure time series of FIG. 5, FIG. 7 is a partial flow chart of a second method for evaluating the connectivity between two production wells according to the invention, and FIG. 8 is a zoom of FIG. 1 in the vicinity of the injection well $I_1$.

DETAILED DESCRIPTION OF THE INVENTION

FIG. 1 shows a schematic geographical map 10 of projected coordinates of production wells 12, referenced as $P_1$ to $P_{12}$, and of injection wells 14, referenced as $I_1$ and $I_2$, in a hydrocarbon production field 16.

A hydrocarbon field 16 is generally exploited during at least two distinct phases. During a first phase, oil is recovered by a number of natural mechanisms such as natural water displacing oil into the production wells 12, expansion of the natural gas at the top of the reservoir, expansion of gas initially dissolved in the oil, etc. These mechanisms create an underground pressure which is able to allow production of oil through the production wells 12. After some time, the underground pressure starts decreasing. At some production wells 12 of the hydrocarbon production field 16, the pressure becomes insufficient to force the oil to the surface.

During a second phase of recovery, external fluids (e.g. water, gas) are injected through injection wells 14 to increase reservoir pressure and replace the natural forces.

In some hydrocarbon production fields, due to a specific geological context, the oil recovery starts directly with the second phase in order to increase the production.

The connectivity between wells is an essential physical property in order to characterize the reservoir. It corresponds to a measure of the degree of hydraulic communication between two locations in the subsurface, for example between two wells.

In the hydrocarbon production field 16 shown in FIG. 1, each of the production wells 12 is instrumented by at least one sensor to measure for example pressure, fluid density and/or temperature. These parameters allow the continuous monitoring of the reservoir properties, and the optimization of the production.

Among these sensors, bottom-hole pressure (BHP) gauges continuously measure the variations of pressure versus time at the bottom of the production wells 12 over large periods (e.g. several years) during the production activities of the hydrocarbon production field 16. These data are generally used for production monitoring, such as reservoir drainage assessment, for well delivery assessment or for reservoir modelling. The sampling frequency of these measurements is generally high, e.g. one measurement every second or every minute, and leads to a large amount of data.

BHP measurements at the production well 12 are the resultant of a dynamic pressure and/or a static pressure. The dynamic pressure relates to the recovery flow rate at the production well 12 (i.e. production activities). The static pressure relates to the pressure that would be measured at the production well 12, at a particular instant, if the well was not producing. The static pressure decreases with time while oil is recovered from the reservoir. This phenomenon is generally referred to as field depletion.

FIG. 2 schematically illustrates a system 100 for evaluating connectivity between a first well and a second well in a hydrocarbon production field 16 using a method according to the invention.

In a first example, the first well is an injection well 14. A first well parameter consisting of an injection rate, for example, is measured at the first well to generate a corresponding first time series of injection rate versus time.

In a second example which will be described later, the first well is a production well 12. A first well parameter consisting of a BHP, for example, is measured at the bottom of the production well 12 to generate a corresponding first time series of BHP versus time. The measurements of the first time series are taken in particular during the production phases of the first well without stopping the production of the well.

The second well is a production well 12. A second well parameter consisting of a BHP, for example, is measured at the bottom of the production well 12 to generate a corresponding second time series of BHP versus time. The measurements of the second time series are taken in particular either during the production phases of the second well without stopping the production, and/or during the interruption of the production phases of the second well.

The system 100, shown in FIG. 2, comprises a calculator 110 for evaluating connectivity between a first well and a second well, a display unit 120 connected to the calculator 110 to display the results provided by the calculator 110 and a man-machine interface 122.

The calculator 110 comprises a database 130. The database 130 contains each first time series and second time series respectively of the first well parameter and of the second well parameter collected during production in the wells 12, 14.

The database 130 is moreover able to store the results provided by the calculator 110.

In the example of FIG. 2, the database 130 is a local database comprised in the calculator 110. In a variant (not represented), the database 130 is a remote database connected to the calculator 110 by a network for example.

The calculator 110 comprises a processor 140 and a memory 150 receiving software modules. The processor 140 is able to execute the software modules to carry out the method according to the invention.

The memory 150 contains a data recovery module 160 for loading the first time series of a first well parameter from the first well and the second time series of a second well parameter from the second well.

The memory 150 also contains a processing module 170 for processing the first time series to obtain a processed first time series.

In the first example, the processing module 170 comprises a first calculation submodule 172 for calculating a processed time series. The processed time series is here a pressure time series at a given distance from the first well, calculated from the injection rate versus time first time series.

In the second example, the processing module 170 comprises a second filtering submodule 174 for filtering the BHP time series by removing the dynamic variations from the first time series to obtain a corrected time series representative of the static variations of the first time series.

The processing module 170 comprises a third filtering submodule 176 for filtering the first time series by removing the field depletion and obtain a processed first time series.

The memory 150 contains a filtering module 180 for filtering the second time series and obtaining a filtered second time series.

The filtering module 180 comprises a first filtering submodule 182 for filtering the second time series by removing the dynamic variations from the second time series to obtain a corrected second time series representative of the static variations of the second time series.

The filtering module 180 comprises a second filtering submodule 184 for filtering the second time series by removing the field depletion.

The memory 150 also contains a correlation module 190 for determining a correlation between the processed first time series and the filtered second time series at various time shifts between the processed first time series and the filtered second time series. The correlation module 190 is able to determine a maximal correlation coefficient and a time shift at maximal correlation between the processed first time series and the filtered second time series. The maximal correlation coefficient is representative of the connectivity between the first well and the second well.

The maximal correlation coefficient and the time shift at maximal correlation are for example stored in the database 130.

The memory 150 advantageously comprises a confidence index module 200 for determining a confidence index of the connectivity between the first well and the second well. The confidence index is typically stored in the database 130.

The memory 150 also contains a module 210 for mapping the maximal correlation coefficient and/or the time shift at maximal correlation and/or the confidence index, for each of production well 12, in relation to another well 12, 14.

In a particular example which will be described later, the memory 150 stores a calculation module 220 for calculating an injection well 14 location. The calculation module 220 calculates location curves of the injection well 14 based on the time shifts at maximal correlation between the processed first time series and the filtered second time series.

The display unit 120 is for example able to display the maps created by the mapping module 210. Typically, the display unit 120 is a standard computer screen.

The man-machine interface 122 typically comprises a keyboard, a mouse and/or a touch screen to allow user to activate the calculator 110 and the various software modules 160, 170, 180, 190, 200, 210, 220 contained in the memory 150 to be processed by the processor 140.

A flow chart of a first method for evaluating the connectivity between two wells carried out with a system 100 as described above is shown in FIG. 3.

The first example relates to the evaluation of the connectivity between an injection well 14 and at least one production well 12, here several production wells 12.

During an initial step 300, a first time series of injection rate of the injection well 14, for example $I_1$, and a second time series of BHP of each production well 12, for example $P_1$ to $P_{12}$ (FIG. 1), are obtained from the database 130 by the data recovery module 160. FIG. 4 depicts for example the injection rate time series 302 of the injection well $I_1$ and FIG. 5 depicts the BHP time series 304 of the production well $P_{11}$.

The data composing the first time series 302 and the second time series 304 are acquired directly onsite by the sensors, during normal production operations of the wells 12, 14, i.e. without deliberately interrupting the production. The data are therefore collected during production phases and during production stop phases, e.g. when maintenance or temporary interruption of production occurs. Each piece of data is a measurement of a particular physical property or of a physical parameter obtained at a well at a given time associated with the measurement.

The duration of the first time series 302 and of the second time series 304 and the sampling frequency of each first time series 302 and of each second time series 304 are preferably identical.

Typically, the duration of the first time series 302 and of the second time series 304 is comprised between 1 month and 20 years, for example 2 years.

For example, the duration of the first time series 302 and of the second time series 304 is chosen so that the injection rate time series 302 encompasses several events, e.g. comprising abrupt interruptions or variations of the injection. The number of events needed to obtain results is typically comprised between 10 and 500 events, for example 50 events.

An event is more generally a change occurring in the injection in the first well which is able to be detected at other locations in particular at a second well.

A high sampling frequency is not required. Typically, the time period of the sampling is comprised between 5 hours and 10 days, for example between 24 and 48 hours. As explained above, BHP time series are often measured with a high sampling frequency, typically 1 Hz or more.

The sampling frequency of the first time series 302 and of the second time series 304 is typically chosen according to the minimal duration of a recorded event so as to characterize each event by at least two samples. For example, the sampling frequency is equal to one sample per day.

During a processing step 310, the injection rate time series 302 is processed by the processing module 170. The processing step 310 comprises a sub-step 311 for obtaining a pressure time series 312 corresponding to the injection rate (FIG. 4), at a given distance from the injection well $I_1$.

For example, using a simple 1D radial flow assumption, the pressure time series 312 is obtained by solving the following radial diffusivity equation:

$$\frac{\partial^2 p}{\partial r^2} + \frac{1}{r}\frac{\partial p}{\partial r} = \frac{\Phi \mu c_t}{k}\frac{\partial p}{\partial t} \quad (1)$$

with p being the pressure, t the time, r the radial distance from the injection well 14, $\Phi$ the porosity of the medium, $\mu$ the fluid viscosity, $c_t$ the total fluid compressibility and k the permeability.

Assuming a constant injection rate q, the solution of the above equation is in the form:

$$p(r,t) = p_i + A \cdot q \cdot E_i(-Br^2) \quad (2)$$

with $p_{(r,t)}$ being the pressure at the injection point calculated from the injection rate, A and B constants and $E_i$ the exponential integral and $p_i$ the initial pressure.

The given distance is chosen by the user. It is not necessarily linked to the actual distance between the injection well 14 and a production well 12. It is typically comprised between 100 meters and 900 meters, for example 300 meters.

The determination of the connectivity between an injection well 14 and all the different production wells 12 is generally made using the same given distance.

The processing step 310 then advantageously comprises a sub-step 314 for filtering the field depletion (i.e. the low frequency component) to obtain a processed injection rate first time series with a zero mean.

For example, in sub-step 314, a mean filter is applied on the pressure time series 312 to obtain a low frequency curve corresponding to the field depletion curve of the pressure time series 312. The field depletion curve is then removed from the pressure time series 312 to obtain the processed injection rate first time series.

The mean filter is a smoothing filter which replaces a given value by the mean value of its neighboring values including the given value. The number of neighboring values, i.e. the smoothing length, is for example adjusted depending on the total duration of the pressure time series 312. The smoothing length is typically comprised between 50 days and 900 days, for example 300 days.

In a next step 320, each BHP time series 304 for each production well 12 is filtered by the filtering module 180 to obtain for each production well 12, a filtered BHP second time series.

The step 320 comprises a sub-step 322 for filtering the dynamic variations of each BHP time series 304 to obtain a corrected static BHP time series 326 representative of the static variations of each BHP time series 304.

For example, in sub-step 322, the filtering is carried out by using a non-linear filter on the BHP time series 304. For example, a median filter is applied on the BHP time series 304 in order to despike the BHP time series 304.

The spikes contained in the BHP time series 304 are typically due to a human action on the production well, for example by an opening or a closing of the well or a change in the production rate. They do not result from events occurring at the injection well.

The median filter is a filter which replaces a given value by the median value of its neighboring values including the given value. The number of neighboring values, i.e. the window length, is for example chosen visually by trial/error. The smoothing length is typically comprised between 3 days and 21 days, for example 5 days.

The median filter allows preserving the sharp edges contained in the BHP time series 304, which typically correspond to production stops.

Sub-step 322 further comprises a step of despiking the time derivative of the despiked BHP time series.

For example, a median filter is applied on the time derivative of the despiked BHP time series. Then, the resulting curve is integrated to obtain the corrected BHP time series 326, as visible on FIG. 5.

Step 320 further comprises a second sub-step 323 for removing field depletion. In sub-step 323, each corrected BHP time series 326 generated in sub-step 322 is filtered to remove the field depletion in order to obtain a filtered BHP second time series 324. Typically, the same mean filter as in sub-step 314 is used with the same smoothing length.

In a step 330, a correlation between the processed injection rate first time series of the injection well 14 and each filtered BHP second time series 324 of the production wells 12 is determined at various time shifts by the correlation module 190. Typically, the correlation between the time series, also known as cross-correlation, is computed for time shifts varying between zero and a maximum positive time shift. The maximum time shift is for example estimated based on a theoretical time for pressure variations induced in the injection well 14 to reach the production well 12.

In particular, at each variation of time shift, the cross-correlation is calculated with the following equation:

$$correl(k) = \sum_{n=1}^{N-k} B1(n) \cdot B2(n+k)$$

correl(k) measures the correlation for a time shift $k\Delta A$ between the first time series B1 and the second time series B2 each of which having a length of N samples.

During step 330, a maximal correlation coefficient, either positive or negative, and a time shift at maximal correlation are determined for each pair of injection well 14 and production well 12.

Each maximal correlation coefficient is then representative of the connectivity between the injection well 14 and the corresponding production well 12.

In a step 340, a confidence index of the maximal correlation coefficient and of the time shift at maximal correlation is computed by the confidence index module 200.

Typically, for each pair of injection well 14 and production well 12, several synthetic random injection rate time series are generated.

For example, the number of synthetic random injection rate time series is comprised between 100 and 500, for example 250.

Each synthetic random injection rate time series is generated with the same duration, the same time sampling period and the same spectral content (e.g. obtained for example by Fourier Transform) as the injection rate time series 302 of the injection well 14, obtained from onsite actual measurements. The spectrum is for example calculated on the filtered BHP second time series 324. The amplitude spectrum is obtained by FFT transform of the filtered second time series 324 filtered by a mean filter having a chosen smoothing length for example equal to 20 days. The phase is then drawn randomly for each realization. Finally, the amplitude and phase spectrums are used to compute the random time series by inverse FFT.

Steps 310, 320 and 330 are applied with each synthetic random injection rate time series, for each BHP time series of each production well 12. The maximal correlation coefficient at maximal correlation is then recorded for each synthetic random injection rate time series.

The confidence index is for example a percentage of synthetic random injection rate time series which lead to obtain a maximal correlation coefficient smaller than the maximal correlation coefficient determined by the cross-correlation of the processed injection rate first time series of the injection well 14 and the filtered BHP second time series 324 of the production well 12.

Step 340 includes a validation of the maximal correlation coefficient determined at step 330, based on the calculated confidence index.

The confidence index is then compared to a predetermined threshold. Typically, a correlation is supposed to be real if the index is greater than 95% and questionable between 80 and 95%. For example, the maximal correlation coefficients which have a confidence index smaller than the threshold are not taken into consideration for the interpretation of the results in terms of connectivity, whereas those having a confidence index greater than the predetermined threshold are validated.

In a step 350, the maximal correlation coefficient and/or the time shift at maximal correlation and/or the confidence index values are represented on a geographical map by the mapping module 210. For example, the values are affected at the location of each mapping production well 12 and a mapping algorithm, such as an inverse distance or a krigging algorithm is used to interpolate the values on the whole map.

The map of the maximal correlation coefficient indicates the connectivity between the injection well 14 and the various productions wells 12.

The values of the maximal correlation coefficients are for example interpreted relatively one to each other. Each relative high correlation is then analyzed using the corresponding graphical plots of the processed injection rate first time series of the injection well 14 and of the filtered BHP second time series 324 of the production wells 12 to confirm the connectivity.

In a variant, the map of the amplitude of the maximal correlation coefficient is interpreted relatively to a map of correlation computed by assuming that all the production wells 12 are connected to all the injection wells 14. To compute this map, in a first step, the resulting BHP time series of each production well are simulated by taking into account the contribution of each injection well 14 on the production wells 12. Then, in a second step, a correlation between the processed injection rate first time series of the first well and each simulated BHP times series of each production well 12 is computed. The resulting maximal correlation coefficient reflects the geometrical correlation between the injection wells 14 and the productions well 12. The wells are likely connected if the maximal correlation coefficients of both maps are similar.

FIG. 7 relates to a second method according to the invention, in which the connectivity is evaluated between a first well being a main production well 12, for example $P_1$, and each other secondary production well 12, for example $(P_2, P_3, \ldots, P_{12})$ (FIG. 1).

The first time series is a BHP time series obtained from measurements at the bottom of the first well.

The second method according to the invention differs from the first method in that in the first step 300, the BHP first time series of the main production well $P_1$ and each BHP second time series of the secondary production wells $(P_2, P_3, \ldots, P_{12})$ are obtained by the data recovery module 160.

The duration and the sampling period of the BHP first time series of the main production well $P_1$ and of each BHP second time series of each secondary production wells $(P_2, P_3, \ldots, P_{12})$ are identical.

In step 310, the BHP first time series of the main production well $P_1$ is processed by the processing module 170 to obtain a processed BHP first time series. Step 310 comprises a sub-step 411 of removing the dynamic part of the BHP first time series of the main production well $P_1$ and a sub-step 414 of filtering the field depletion. The sub-steps 411 and 414 are respectively similar to sub-steps 322 and 323, described in the first method according to the invention.

The method is then similar to the first method, except in that during step 330, the time shifts can have a negative value or a positive value. The time shifts are varied from a minimal negative time shift to a maximal positive time shift to determine the maximal correlation and the time shift at maximal correlation.

In the second method according to the invention, the same filtering of the dynamic part, is applied to all production wells 12 and therefore the same errors are introduced in all the BHP time series of the production wells 12 (main well and secondary wells), which leads to very reliable results.

In a variant of the second method, the location of the injection well 14 which is the source of the BHP variations measured at each production well 12 is determined by the calculation module 220.

The time shift at maximal correlation between the BHP first times series respectively of the main production well 12, for example $P_1$, and a given production well 12 from the secondary productions wells, for example $P_9$, is used to calculate a first curve location 462 of the injection well $I_1$, assuming an average propagation velocity. The first curve is a first hyperbola.

The time shift obtained at maximal correlation between the BHP first times series respectively of the main production well 12, for example $P_1$, and of another given production well 12 from the secondary production wells, for example $P_2$, is used to calculate a second curve location 464 of the injection well $I_1$, assuming the same propagation velocity as above. In a variant, another value of propagation velocity, different to the propagation velocity used above, is used. The second curve is a second hyperbola.

The location of the injection well $I_1$ is determined as the intersection of the first curve location 462 and the second curve location 464.

In another variant, if the location of the injection well $I_1$ which is the source of the BHP variations measured at each productions well 12 is known, an average diffusivity K and hence, an average permeability are determined using the following equations:

$$K = \frac{r^2}{4t}$$

$$k = K \cdot \Phi \cdot \mu \cdot C_t$$

with r the distance between the injection well $I_1$ and the secondary production well $(P_2, P_3, \ldots, P_{12})$, t the time shift at maximal correlation of the correlation between the BHP first time series of the main production well $P_1$ and the BHP second time series of each secondary production well $(P_2, P_3, \ldots, P_{12})$, t the porosity, $\mu$ the fluid viscosity and $C_t$ the total fluid compressibility.

In a variant of the first or of the second method according to the invention, the second well is a closed injection well comprising a BHP gauge.

In another variant of the method according to the invention (not represented), the first well is a production well 12. A first well parameter consisting of a BHP induced by a recovery flow rate (dynamic pressure) is measured at the bottom of the first well. The measured data is used to generate a corresponding first times series, for example of a pressure at a given distance from the first well, using the equations described in processing step 310.

The method is then identical to the first method according to the invention.

In another variant of the method according to the invention (not represented), the first well parameter and the second well parameter are for example fluid salinity or fluid temperature. Equations (1) and (2) are then replaced by appropriate transport and heat diffusion equations.

The method for determining the connectivity between two wells according to the invention is very simple. It uses measurements that are recorded routinely during the production activities of a hydrocarbon field. It does not require an interruption of production for performing any special field operations like during drill stem tests or during any other well interference techniques. The method is therefore inexpensive.

In particular, no spectral correlation or analysis is required, since the correlation is done exclusively in the time domain and not in the frequency domain.

The method does not require any a priori assumptions on reservoir properties and on its geometry.

The computations made during the different steps of the method are fast and the method does not require a high computational power. Consequently, the method can be easily implemented in a graphical user interface which can be used interactively with various datasets.

The invention claimed is:

1. A method for evaluating connectivity between a first well and a second well in a hydrocarbon production field comprising:
    obtaining a first time series of a first well parameter from the first well and a second time series of a second well parameter from the second well, wherein the second time series are obtained by a BHP gauge at a bottom of the second well,
    processing the first time series to obtain a processed first time series,
    filtering the second time series by removing dynamic variations from the second time series to obtain a filtered second time series representative of static variations of the second time series,
    determining a correlation between said processed first time series and said filtered second time series at various time shifts between said processed first time series and said filtered second time series,
    determining a maximal correlation coefficient and a time shift at maximal correlation between said processed first time series and said filtered second time series, the maximal correlation coefficient being representative of the connectivity between the first well and the second well, and
    displaying, through a graphical user interface, the maximal correlation coefficient and the time shift at the maximal correlation on a geographical map indicating the connectivity between the first well and the second well.

2. The method according to claim 1, wherein the first well parameter and the second well parameter are each chosen among bottom hole pressure, injection rate, fluid salinity or fluid temperature.

3. The method according to claim 1, wherein the first well is an injection well or a production well and the second well is a production well.

4. The method according to claim 1, wherein the filtering step comprises a sub-step of filtering the second time series to remove the dynamic variations from the second time series to obtain a corrected second time series, representative of the static variations of the second time series, the filtering being made with a non-linear filter.

5. The method according to claim 4, wherein the non-linear filter is a median filter.

6. The method according to claim 1, wherein the processing step and/or the filtering step comprise a sub-step of filtering a field depletion.

7. The method according to claim 6, wherein the filtering step is made with a mean filter.

8. The method according to claim 1, wherein the method further comprises a step of determining a confidence index of the connectivity between the first well and the second well.

9. The method according to claim 1, wherein the method further comprises a step of mapping the maximal correlation coefficient and/or the time shift at maximal correlation in the hydrocarbon production field.

10. The method according to claim 1, wherein the first well is an injection well and the first well parameter is an injection rate, the processing step comprising a sub-step of calculating a pressure time series at a given distance from the first well, from an injection rate time series of the first well.

11. The method according to claim 1, wherein the first well is a production well and the processing step comprises a step of filtering the first well time series by removing dynamic variations from the first time series to obtain a corrected first time series representative of static variations of the first time series.

12. The method according to claim 1, wherein the first well and the second well are production wells and the method further comprises calculating a first location curve of an injection well connected to the first well and to the second well, based on a time shift at maximal correlation between the first time series of the first well and the second time series of the second well.

13. The method according to claim 12, wherein the method further comprises calculating a second location curve of the injection well connected to the first well and to the second well, based on a time shift at maximal correlation between the first time series of the first well and an additional second time series of an additional second well connected to said injection well, the intersection of the first location curve and of the second location curve indicating the location of said injection well connected to the first well, to the second well and to the additional second well.

14. The method according to claim 1, wherein the first well and the second well are production wells and the method further comprises determining an average diffusivity based on the time shift at maximal correlation between the first time series of the first well and the second time series of the second well and based on the location of an injection well connected to the first well and to the second well.

15. A computer program product comprising software instructions which, when executed by a computer, carry out the method according to claim 1.

16. A system for evaluating connectivity between a first well and a second well in a hydrocarbon production field comprising:
- a data recovery module for obtaining a first time series of a first well parameter from the first well and a second time series of a second parameter from the second well, wherein the second time series are obtained by a BHP gauge at a bottom of the second well,
- a processing module for processing the first time series to obtain a processed first time series,
- a filtering module for filtering the second time series by removing dynamic variations from the second time series to obtain a filtered second time series representative of static variations of the second time series,
- a correlation module for determining a correlation between said processed first time series and said filtered second time series at various time shifts between said processed first time series and said filtered second time series, and for determining a maximal correlation coefficient and a time shift at maximal correlation between said processed first time series and said filtered second time series, the maximal correlation coefficient being representative of the connectivity between the first well and the second well, and
- a display unit for presenting the maximal correlation coefficient and the time shift at the maximal correlation on a geographical map indicating the connectivity between the first well and the second well.

17. A method for evaluating connectivity between a first well and a second well in a hydrocarbon production field comprising:
- obtaining a first time series of a first well parameter from the first well and a second time series of a second well parameter from the second well, wherein the second time series are obtained by a fluid salinity sensor arranged in the second well or by a temperature sensor arranged in the second well,
- processing the first time series to obtain a processed first time series,
- filtering the second time series by removing dynamic variations from the second time series to obtain a filtered second time series representative of static variations of the second time series,
- determining a correlation between said processed first time series and said filtered second time series at various time shifts between said processed first time series and said filtered second time series,
- determining a maximal correlation coefficient and a time shift at maximal correlation between said processed first time series and said filtered second time series, the maximal correlation coefficient being representative of the connectivity between the first well and the second well, and
- displaying, through a graphical user interface, the maximal correlation coefficient and the time shift at the maximal correlation on a geographical map indicating the connectivity between the first well and the second well.

* * * * *